Figure 1:
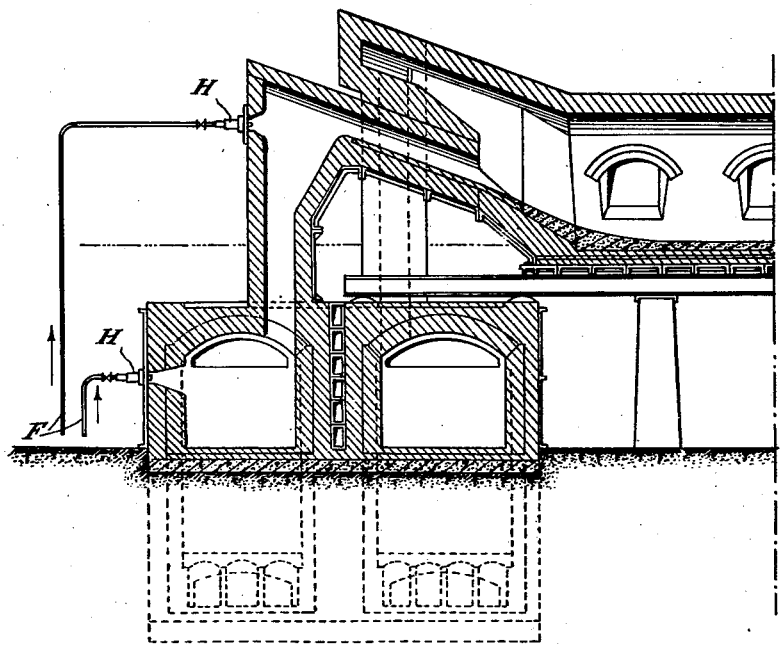

Dec. 29, 1936.  F. FIORELLI  2,066,103
COMBUSTION PROCESS FOR THE USE OF FLUID FUEL IN MARTIN FURNACE
Filed Aug. 3, 1934  2 Sheets-Sheet 1

F. Fiorelli
INVENTOR

By Glascock Downing Seebold
Attys.

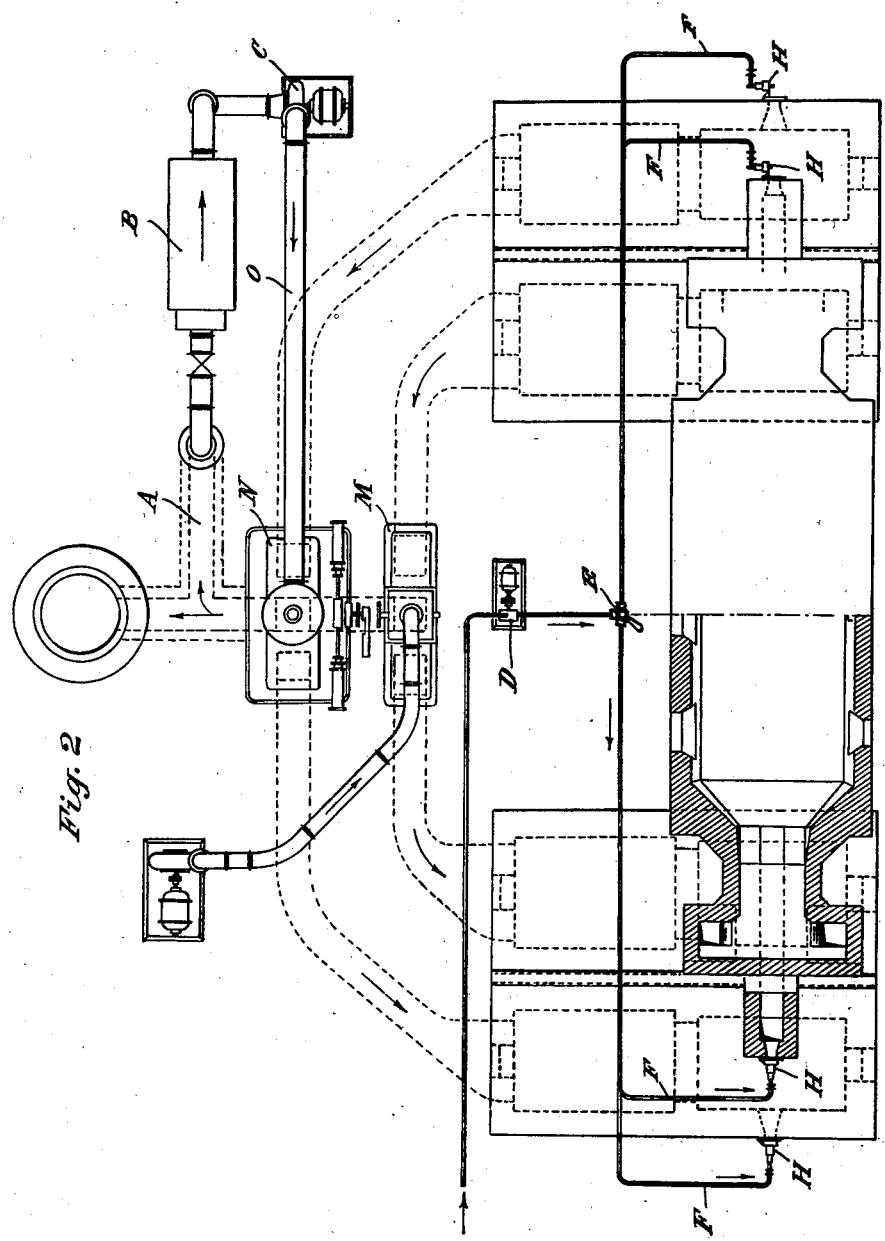

Patented Dec. 29, 1936

2,066,103

UNITED STATES PATENT OFFICE 2,066,103

COMBUSTION PROCESS FOR THE USE OF FLUID FUEL IN MARTIN FURNACES

Ferdinando Fiorelli, Terni, Italy

Application August 3, 1934, Serial No. 738,368
In Italy July 14, 1934

2 Claims. (Cl. 263—52)

The present invention particularly relates to the use of fluid fuel in Martin furnace, but may be extended to any other furnace with reversal flame.

In Martin furnaces fed by the common known process the fluid fuel is injected into the hearth by air or steam atomizers and directly burnt.

The secondary air is pre-heated in the only existing regenerating chamber on each side of the furnace or in the case of modified gas furnaces in the group of the two chambers functioning in parallel for the air alone.

This simple, natural system does not allow a convenient regulation of the combustion and consequently is not efficient. This is proved by the fact that furnaces functioning with naptha or tar, though using rich coals, have not in general an output greater than that of furnaces fed by gas produced by a generating apparatus, the charge of course being equal.

The low output as mentioned is owing to the nature of the combustion producing, according to the way in which it is developed, a narrow flame with unsuitable characteristics both from a thermical and metallurgical point of view for the exigencies of the operation to be performed.

The system according to present application is based on the following principle:

"Gasification of liquid fuel and combustion of the gas obtained, conveniently diluted, under normal conditions of working of Martin furnaces."

In other words the method suggested is for realizing in Martin furnaces, by using liquid fuels, the same working process used for gas functioning and by adding as regards the latter the advantages deriving from a higher calorific value available.

These conditions are obtained by utilizing the normal regenerating chambers of the gas for preheating a determined quantity of combustion products and by injecting into these products the liquid fuel to be gasified.

The burnt gases sucked at the furnace chimney after oxygen has been conveniently neutralized in them serve at the same time to feed the necessary calories for the gasification and for diluting the gas produced in the necessary proportion in order to obtain in the hearth an easily adjustable flame.

In the accompanying drawings Fig. 1 shows a longitudinal section of the furnace with a view of the atomizers; Fig. 2 shows a plan section and the schematic positions of the following different parts and apparatuses:

A—Combusion products collecting gallery.
B—Cooling mixture.
C—Liquid fuel pump.
D—Liquid fuel pump.
E—Reversing cock.
F—Feeding conduits
H—Atomizers.

M and N are the usual air and gas reversing valves, the burnt gas flue O leading in this case to the gas valve.

The burnt gases sucked in the wanted quantity by fan C and purified in the cooling mixture B are admitted into the regenerating chambers through the gas reversing valve N, the combustion air blown into valve M following its normal circuit.

Substantially the furnace does not suffer any alteration and may indifferently function with gas or liquid fuel. The position of the atomizers is shown in two distinct points (slag chambers and gas uptakes) in order to have the following possibilities of first neutralizing in a first phase the oxygen contained in combustion products by means of the atomizer placed before the uptakes to reduce in a second step all the carbonic acid ($CO_2$) into carbon monoxide (CO) and to contribute to the adjustment or increase of the flame's speed by means of the atomizer placed in the inclined fuel flue to the hearth. The position of the nozzle in the flue will be fixed in relation to the speed wanted.

Having now particularly described and ascertained the nature of my said invention and in what manner the same is to be performed I declare that what I claim is:

1. Combustion process for liquid fuel in furnaces with reversal flame which comprises atomizing the fuel, withdrawing a portion of the exhaust gases from the flue, purifying and preheating the same, and mixing it with atomized fuel at one point, thereby neutralizing the oxygen contained in the exhaust gases, reducing the carbonic acid ($CO_2$) to carbonic oxide (CO) by the injection of atomized fuel at another point and adding air thereto and burning the mixture.

2. Combustion process for liquid fuels in furnaces with reversal flame which comprises gasifying the fuel, mixing therewith products of combustion and then adding air to said mixture, the fuel being fed at two different points first to neutralize the oxygen and second to convert the gases into CO.

FERDINANDO FIORELLI.